Figure 1:
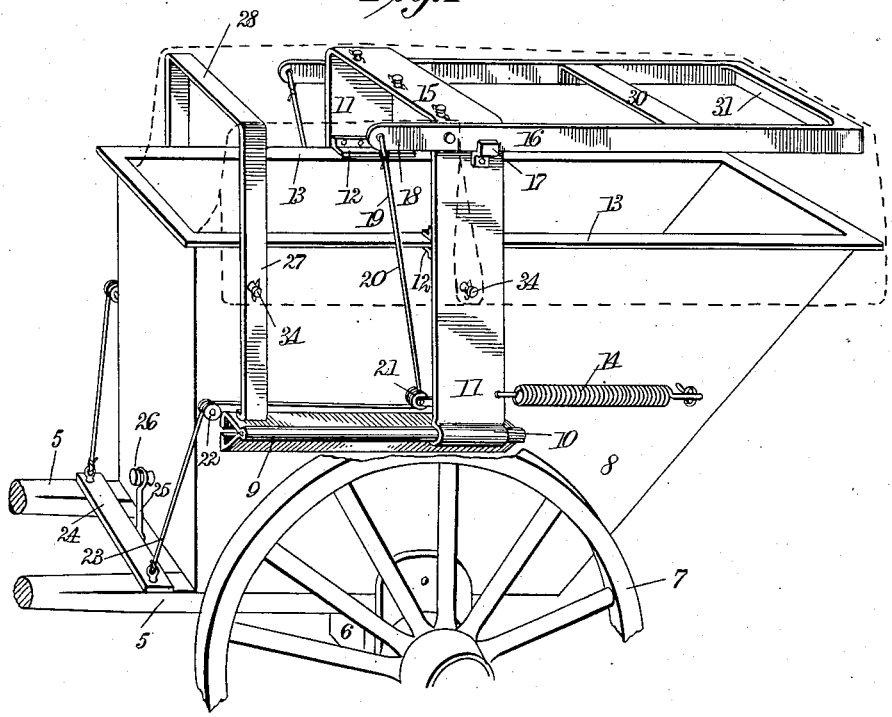

L. WOLF.
DUMPING CART.
APPLICATION FILED MAY 2, 1911.

1,024,959.

Patented Apr. 30, 1912.

WITNESSES
F. E. Alexander
E. B. Marshall

INVENTOR
Lesser Wolf
BY Munn & Co
ATTORNEYS

COLUMBIA PLANOGRAPH CO., WASHINGTON, D. C.

UNITED STATES PATENT OFFICE.

LESSER WOLF, OF NEW YORK, N. Y., ASSIGNOR OF ONE-HALF TO HERBERT BLANKFORT, OF BROOKLYN, NEW YORK.

DUMPING-CART.

1,024,959.  Specification of Letters Patent.  Patented Apr. 30, 1912.

Application filed May 2, 1911. Serial No. 624,536.

*To all whom it may concern:*

Be it known that I, LESSER WOLF, a citizen of the United States, and a resident of the city of New York, borough of the Bronx, in the county and State of New York, have invented a new and Improved Dumping-Cart, of which the following is a full, clear, and exact description.

My invention relates to dumping carts and it has for its object to provide one having a body, there being supports movable relatively to the body to which hood carrying arms are pivoted, the arms being connected with the thills of the cart, so that when the body is dumped the hood will be raised and will be drawn forward, relatively to the body.

Additional objects of the invention will appear in the following complete description, in which the preferred form of the invention is disclosed.

In the drawings similar characters of reference indicate corresponding parts in both the views, in which—

Figure 2:
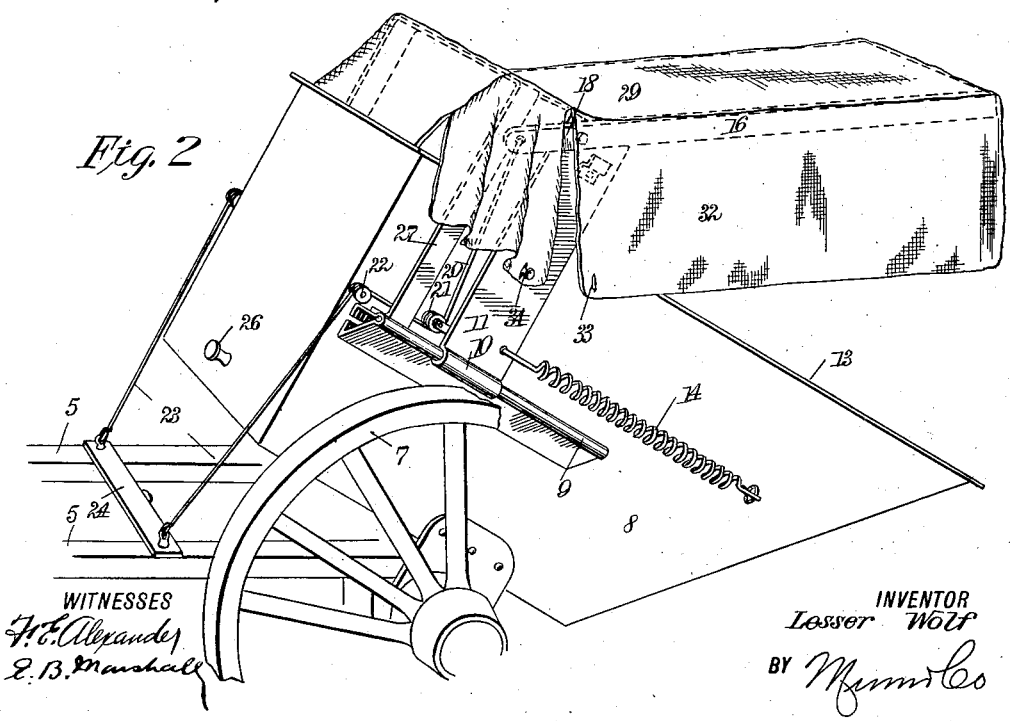

Figure 1 is a perspective view of the cart; and Fig. 2 is a similar view with the body of the cart in dumping position.

By referring to the drawings it will be seen that there are thills 5, which are secured to the frame 6, carrying the axles on which the wheels 7 are mounted. The body 8 is pivoted to the frame 6. On the sides of the body there are guideways 9, which are embraced by the guides 10, secured to the supports 11. There are also guides 12, which are secured to the supports 11, and which engage the flange 13 at the top of the sides of the body 8. Springs 14 are provided, which connect the supports 11 with the body for holding the supports yieldingly in a predetermined position relatively to the body. The supports 11 are connected by a transverse member 15. To the supports 11 are pivoted levers 16, one set of arms of the said levers 16 normally resting on the brackets 17, which are secured to the supports 11. To the other set of arms 18 of the lever 16, there are secured one set of terminals 19 of the cords 20, the cords 20 passing around the pulleys 21, which are secured to the supports 11, the cords then being brought forward, and passed over pulleys 22, secured to the body 8. The other set of terminals 23 of the cords 20 are secured to the transverse member 24, which in turn is secured to the thills 5. A hook 25 is pivoted to the transverse member 24, this hook 25 normally engaging the pin 26, secured to the body 8. The supports 27 are secured to the side of the body, these supports 27 being connected by a transverse member 28. Normally disposed on the transverse members 15 and 28 there is a hood 29, the hood extending rearwardly over the rear arms of the lever 16, and resting on the transverse members 30 and 31, which are secured to the said rearwardly extending arms of the said lever 16. The hood 29 has flaps 32, with openings 33, in which the pins 34 secured to the supports 11 and 27, are normally disposed. When the cart is in normal position, as shown in Fig. 1 of the drawings, and is being filled, any one of the flaps 32 may be raised to permit ashes or garbage to be dumped from a barrel into the body 8, either over the side or over the rear of the body. When the body has been filled, the flaps 32 are secured to the body to prevent the ashes and garbage from being blown from the cart. When it is desired to rotate the body to dump its contents the flaps 32 at the rear of the hood are freed from the supports 11 and the hook 25 is then freed from the pin 26, after which the body 8 may be rotated to dump its contents in the customary manner. As the body 8 rocks to dump its contents the cord 20 is prevented from moving rearwardly, as its terminals 23 are secured to the transverse member 24, which in turn is secured to the thills 5. It will therefore be seen that as the body 8 rocks rearwardly, the cord 20 will cause the supports 11 to move forwardly, relatively to the body, and at the same time the cord 20 will draw down the arms 18 of the levers 16, to raise the rearwardly extending arms of the said lever 16. In this way the hood 29 is raised at the rear of the body and is drawn forward relatively to the body when the body of the cart is rocked to dumping position.

Having thus described my invention I claim as new and desire to secure by Letters Patent:

1. In a dumping cart a member, a body pivoted relatively thereto, a guideway on the body, a support having a guide for traveling on the guideway, a hood mounted on the support, and connecting means between the support and the member for holding the support and preventing its movement with the body when the body is rotated.

2. In a dumping cart a member, a body pivoted relatively thereto, guideways at the sides of the body, supports having guides for traveling on the guideways, a hood mounted on the supports, connecting means between the supports and the member for holding the supports and preventing their movement with the body when the body is rotated, and springs connecting the supports with the body.

3. In a dumping cart a member, a body pivoted relatively thereto, a guideway on the body, a support having a guide for traveling on the guideway, an arm pivoted to the support, a hood mounted on the arm, and connecting means between the arm and the member for moving the arm relatively to the support, and the support relatively to the body, when the body is rotated.

4. In a dumping cart a member, a body pivoted relatively thereto, a guideway on the body, a support having a guide for traveling on the guideway, an arm pivoted to the support, a hood mounted on the arm, a pulley secured to the support, and a cord secured at one terminal to the arm, the cord being disposed around the pulley with its other terminal secured to the said member.

5. In a dumping cart a member, a body pivoted relatively thereto, guideways on the sides of the body, supports having guides disposed for traveling on the guideways, arms pivoted to the supports, a hood mounted on the arms, pulleys on the supports, cords having one set of terminals secured to the arms, the cords being disposed around the pulleys, with their other set of terminals secured to the member and springs for holding the supports yieldingly rearward.

6. In a dumping cart a member, a body pivoted relatively thereto, guideways on the sides of the body, supports having guides disposed for traveling on the guideways, arms pivoted to the supports, a hood mounted on the arms, pulleys on the supports, cords having one set of terminals secured to the arms, the cords being disposed around the pulleys, with their other set of terminals secured to the member, and springs connecting the supports with the body.

7. In a dumping cart a member, a body pivoted relatively thereto, guideways on the sides of the member, supports having guides disposed for traveling on the guideways, levers pivoted intermediate of their terminals to the supports, cords having one set of terminals secured to one set of arms of the levers, pulleys secured to the supports, the cords being disposed around the pulleys, with their other set of terminals secured to the said member, and brackets on the supports on which the other set of arms of the levers normally rest.

8. In a dumping cart a member, a body pivoted relatively thereto, guideways on the sides of the body, supports having guides disposed for traveling on the guideways, arms pivoted to the supports, a hood mounted on the arms, pulleys on the supports, cords having one set of terminals secured to the arms, the cords being disposed around the pulleys, with their other set of terminals secured to the member, another support for the hood secured to the body, flaps on the hood, and means for securing the flaps to the body.

In testimony whereof I have signed my name to this specification in the presence of two subscribing witnesses.

LESSER WOLF.

Witnesses:
EVERARD BOLTON MARSHALL,
PHILIP D. ROLLHAUS.

Copies of this patent may be obtained for five cents each, by addressing the "Commissioner of Patents, Washington, D. C."